US011138457B2

(12) United States Patent
Park et al.

(10) Patent No.: US 11,138,457 B2
(45) Date of Patent: Oct. 5, 2021

(54) APPARATUS AND METHOD OF READING LICENSE PLATE

(71) Applicant: ELECTRONICS AND TELECOMMUNICATIONS RESEARCH INSTITUTE, Daejeon (KR)

(72) Inventors: Su Wan Park, Daejeon (KR); Bum Suk Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/829,483

(22) Filed: Mar. 25, 2020

(65) Prior Publication Data

US 2020/0311457 A1    Oct. 1, 2020

(30) Foreign Application Priority Data

Mar. 28, 2019    (KR) .......................... 10-2019-0036285

(51) Int. Cl.
*G06K 9/32*    (2006.01)
*G06K 9/46*    (2006.01)
*G06T 9/00*    (2006.01)

(52) U.S. Cl.
CPC .............. *G06K 9/3258* (2013.01); *G06K 9/46* (2013.01); *G06T 9/002* (2013.01); *G06K 2209/15* (2013.01)

(58) Field of Classification Search
CPC .................................................. G06T 9/002
See application file for complete search history.

(56) References Cited

U.S. PATENT DOCUMENTS

| 10,019,640 | B2* | 7/2018 | Almeida ................. G06K 9/325 |
| 10,963,719 | B1* | 3/2021 | Hantehzadeh ........... G06K 9/32 |
| 2007/0124198 | A1* | 5/2007 | Robinson ............... G06Q 20/14 |
| | | | 705/13 |
| 2015/0110358 | A1 | 4/2015 | Han et al. |
| 2018/0121744 | A1 | 5/2018 | Kim et al. |
| 2018/0189588 | A1 | 7/2018 | Ahn |
| 2019/0370588 | A1* | 12/2019 | Georgis ............. G06K 9/00483 |
| 2020/0125876 | A1* | 4/2020 | Cai ......................... G06F 17/18 |
| 2020/0311457 | A1* | 10/2020 | Park ....................... G06K 9/325 |

FOREIGN PATENT DOCUMENTS

WO    2016/208870 A1    12/2016

OTHER PUBLICATIONS

Svoboda, et al, "CNN for license plate motion deblurring", Sep. 2016, IEEE, pp. 3832-3836 (Year: 2016).*

* cited by examiner

*Primary Examiner* — Edward Park
(74) *Attorney, Agent, or Firm* — LRK Patent Law Firm

(57) ABSTRACT

The present invention provides a system for reading a license plate from a poor image captured in various environments. To this end, the present invention provides a license plate reading apparatus and method using deep learning technology and provides a license plate learning apparatus and method for generating and providing a restoration neural network and a recognition neural network by using the license plate reading apparatus and method, thereby implementing a circular recognition network generating and using system.

8 Claims, 6 Drawing Sheets

| | RESTORATION IMAGE 1 | RESTORATION IMAGE 2 | ... | RESTORATION IMAGE n |
|---|---|---|---|---|
| TOP3 DIGIT | $\{X_{11}, X_{12}, X_{13}\}$ | $\{X_{21}, X_{22}, X_{23}\}$ | ... | $\{X_{n1}, X_{n2}, X_{n3}\}$ |
| PROBABILITY VALUE | $\{P_{11}, P_{12}, P_{13}\}$ | $\{P_{21}, P_{22}, P_{23}\}$ | ... | $\{P_{n1}, P_{n2}, P_{n3}\}$ |

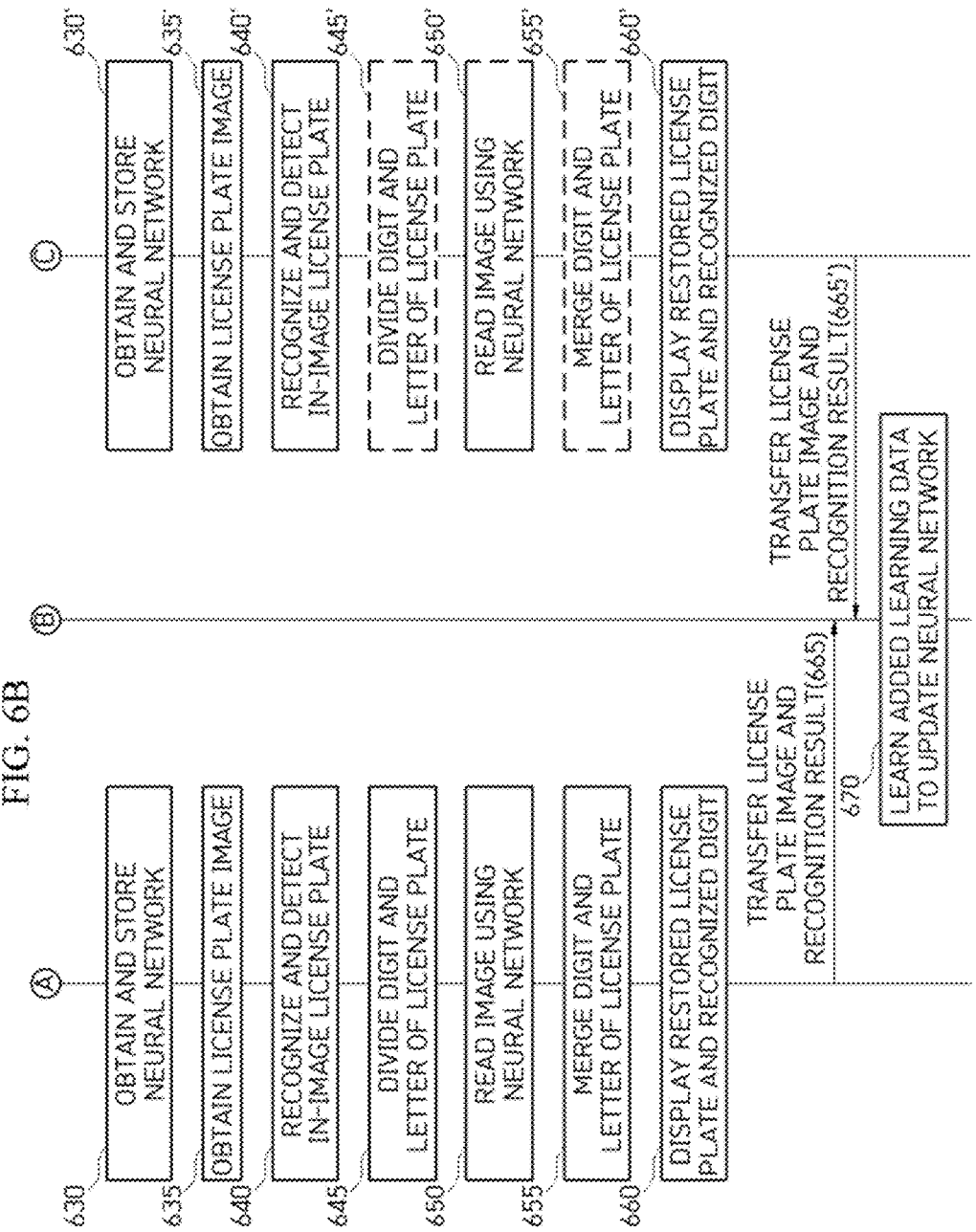

APPARATUS AND METHOD OF READING LICENSE PLATE

CROSS-REFERENCE TO RELATED APPLICATION

This application claims priority under 35 U.S.C. § 119 to Korean Patent Application No. 10-2019-0036285, filed on Mar. 28, 2019, the disclosure of which is incorporated herein by reference in its entirety.

BACKGROUND

1. Field of the Invention

The present invention relates to technology for reading a license plate, and more particularly, to technology for reading a license plate by using a poor image obtained in various environments.

2. Description of Related Art

Recently, services for life convenience and social safety are provided to persons through various types of vehicle number recognition apparatuses. For example, persons meet with vehicle number recognition apparatuses having various purposes such as unmanned control apparatuses for velocity and traffic light violation, traffic information collection apparatuses, vehicle number plate reading apparatuses installed in expressway entrances, vehicle number recognition cameras for crime prevention, and parking control apparatuses in daily life, and the demand thereof is continuously increasing.

However, an image captured in a real environment has many limitations in recognizing and reading a vehicle number due to various noises (fog, illumination, motion blur, etc.), non-recognition (an angle and low image quality) caused by an installed position of a closed-circuit television (CCTV), damage of a vehicle license plate, and pollution. In such a vehicle number recognition apparatus, unrecognized or misrecognized data needs intervention of a person, and improvement is needed because a lot of works and difficulty of check based on eyes.

In technologies actively used in a convention police service, vehicle number identification technology is much researched recently in terms of a vision algorithm, for minimizing intervention of a person and increasing the efficiency of time and cost. However, massive proof data is needed for developing vehicle number identification technology for overcoming a limitation of the visual performance of persons by using deep learning technology, and ground truth (GT) collection and analysis for proof learning data are needed, and due to this, research is limited.

SUMMARY

Accordingly, the present invention provides an apparatus and method of reading a vehicle license, which restores a poor license plate, which is difficult to read with eyes, to a readable image and identifies a vehicle number.

The present invention also provides a circular recognition network generating and using system which provides a license plate learning apparatus and method using deep learning technology to update performance to enhanced performance on the basis of an unrecognized number identification function having time and cost efficiency and a feedback of identified data.

Advantages and features of the present invention, and implementation methods thereof will be clarified through following embodiments described with reference to the accompanying drawings.

In one general aspect, an electronic device for reading a license plate on the basis of a license plate image includes a storage configured to store a license plate image and a restoration neural network and a recognition neural network for each reading the license plate and a processor, wherein the processor includes a license plate detecting unit configured to obtain the license plate image, an image restoring unit configured to restore the license plate image on the basis of the restoration neural network, and an image recognizing unit configured to recognize a number of the license plate image on the basis of the recognition neural network.

The license plate detecting unit may obtain each number of the license plate or the whole license plate as the license plate image.

The image restoring unit may restore the license plate image to at least one restoration image on the basis of the restoration neural network.

The image recognizing unit may determine at least one prediction number corresponding to the license plate image on the basis of the recognition neural network and may recognize the at least one prediction number as a number of the license plate image on the basis of a probability value of the at least one prediction number.

The image restoring unit may restore the license plate image to at least one restoration image on the basis of the restoration neural network, and the image recognizing unit may determine at least one prediction number corresponding to the restoration image on the basis of the recognition neural network.

The image recognizing unit may recognize the at least one prediction number as a number of the license plate image on the basis of a probability value or a frequency number of the at least one prediction number.

The electronic device may further include a display unit configured to display a read result of the license plate image, wherein the display unit may display the read result in the form of one license plate.

The processor may be further configured to obtain the restoration neural network and the recognition neural network and store the obtained restoration neural network and recognition neural network in the storage.

In another general aspect, a method of reading a license plate on the basis of a license plate image includes obtaining a restoration neural network and a recognition neural network for each reading a license plate, obtaining a license plate image which is to be read, restoring the license plate image on the basis of the restoration neural network, and recognizing a number of the license plate image on the basis of the recognition neural network.

The restoring may include restoring the license plate image to at least one restoration image on the basis of the restoration neural network, and the recognizing may include determining at least one prediction number corresponding to the at least one restoration image on the basis of the recognition neural network.

The recognizing may include recognizing the at least one prediction number as a number of the license plate image on the basis of a probability value or a frequency number of the at least one prediction number.

The method may further include transmitting a read result of the license plate.

In another general aspect, a license plate learning method includes obtaining learning data of a license plate, learning the learning data to generate a restoration neural network for restoring a license plate image, and learning the learning data to generate a recognition neural network for identifying a number of the license plate.

The obtaining of the learning data may include obtaining obtains each number of the license plate or the whole license plate as one piece of learning data.

The license plate learning method may further include obtaining additional learning data on the basis of a result obtained by reading the license plate and learning the additional learning data to update the restoration neural network and the recognition neural network.

Other features and aspects will be apparent from the following detailed description, the drawings, and the claims.

BRIEF DESCRIPTION OF THE DRAWINGS

FIG. 5 is a chart illustrating a recognition neural network application result according to an embodiment.

FIGS. 6A and 6B are flowcharts illustrating an operating process of a license plate reading system according to an embodiment.

DETAILED DESCRIPTION OF EMBODIMENTS

Further aspects of the present invention described above will be clarified through the following embodiments described with reference to the accompanying drawings. The terms used herein are for the purpose of describing particular embodiments only and are not intended to be limiting of example embodiments. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

The present invention is for providing an apparatus which restores a poor license plate image, which is captured in a real environment and is difficult to read with eyes, to a recognizable image or identifies an in-image number and provides a license plate reading system including a license plate reading apparatus for providing a poor-license plate reading service by using a neural network and a license plate learning apparatus providing a deep learning-based neural network learning.

Figure 1:
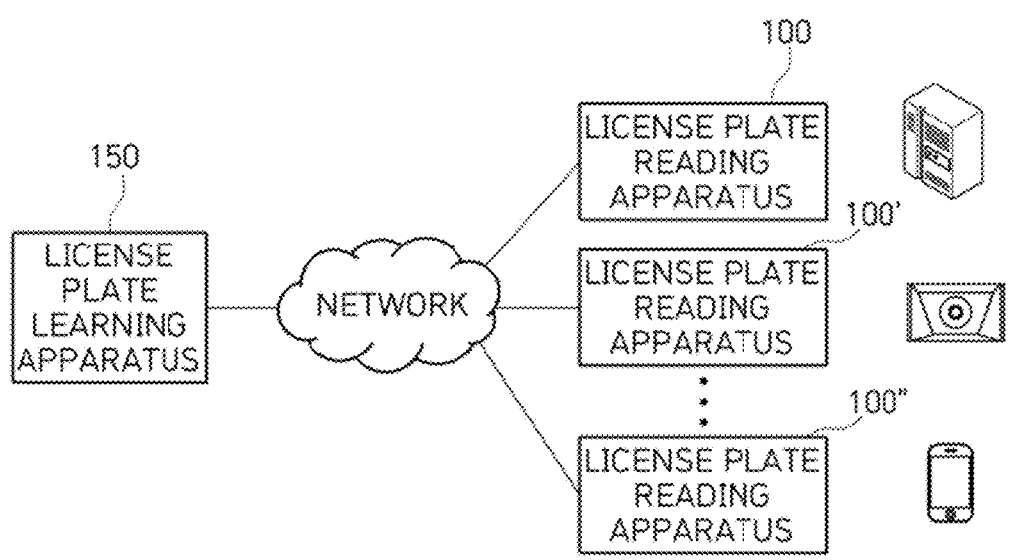
FIG. 1 schematically illustrates a license plate reading system according to an embodiment.

FIG. 1 schematically illustrates a license plate reading system according to an embodiment.

The license plate reading system may include a license plate learning apparatus 150 and a plurality of license plate reading apparatuses 100, 100', and 100".

The license plate learning apparatus 150 may perform deep learning-based neural network learning.

The license plate learning apparatus 150 may be a server which performs neural network learning by using a number of a license plate as learning data and may generate a license plate reading neural network usable by the license plate reading apparatuses 100, 100', and 100".

The license plate reading apparatuses 100, 100', and 100" may provide a license plate reading service by using a neural network provided by the license plate learning apparatus 150.

The license plate reading apparatuses 100, 100', and 100" may be a terminal which restores a poor license plate image by using neural networks obtained from the license plate learning apparatus 150 or performs a function of identifying a vehicle number included in a license plate image. In an embodiment, the license plate reading apparatuses 100, 100', and 100" may be provided through a user graphics user interface (GUI) for performing a license plate reading function according to the present invention. In an embodiment, the license plate reading apparatuses 100, 100', and 100" may include a weight-lighting terminal such as a high-specification image control server 100, a black box 100', and a smartphone 100". A number of a license plate may include numbers, letters, a sign, and a symbol. The letters may include letters of various languages. For example, the letters may include alphabets.

Figure 2:
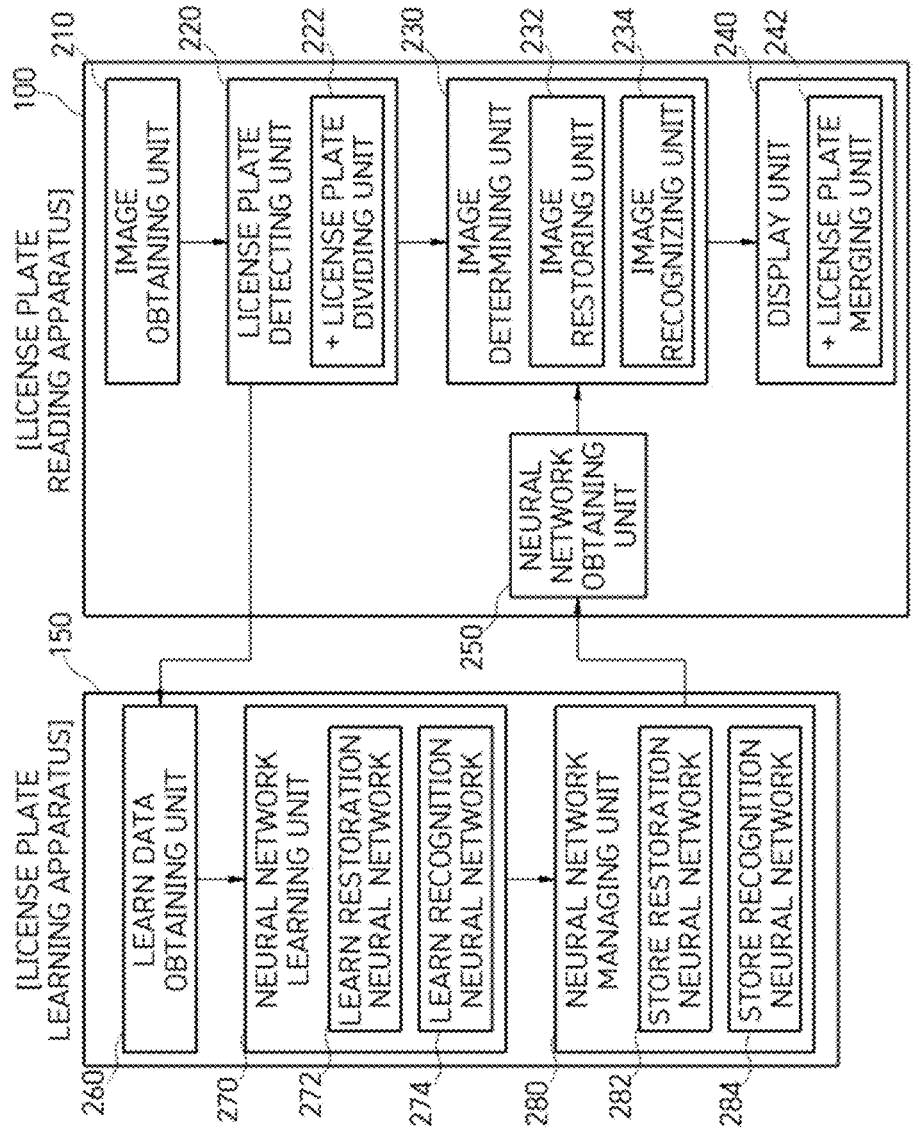
FIG. 2 is a block diagram of a license plate learning apparatus and a license plate reading apparatus according to an embodiment.

FIG. 2 is a block diagram of a license plate learning apparatus 150 and a license plate reading apparatus 100 according to an embodiment.

The license plate learning apparatus 150 may perform a license plate learning method according to an embodiment.

The license plate learning apparatus 150 may perform neural network learning on the basis of learning data and may generate a neural network used for reading a license plate in the license plate reading apparatus 100.

The license plate learning apparatus 150 may be a computing device which includes a processor and a storage for storing a restoration neural network and a recognition neural network. The processor of the license plate learning apparatus 150 may be configured to execute a learning data obtaining unit 260, a neural network learning unit 270, and a neural network managing unit 280.

The learning data obtaining unit 260 may obtain learning data of a license plate to be read.

The learning data obtaining unit 260 may collect and mange learning data ground truth (GT) needed for performing neural network learning. In an embodiment, the learning data obtaining unit 260 may obtain one piece of learning data corresponding to a whole license plate, or may obtain learning data by units of vehicle numbers of a license plate. For example, the learning data obtaining unit 260 may be used as real environment data and processed (motion blur and the like) data as leaning data, for increasing an accuracy of recognizing a license plate.

The neural network leaning unit 270 may generate various neural networks needed for reading a license plate by using learning data obtained by the learning data obtaining unit 260. In an embodiment, the neural network learning unit 270 may learn learning data obtained by the learning data obtaining unit 260 to generate a restoration neural network for restoring a license plate image and a recognition neural network for identifying a number of the license plate.

The neural network learning unit 270 may perform learning of the restoration neural network for improving or restoring the license plate image so as to recognize a poor license plate with eyes in step 272.

The restoration neural network may be a neural network which improves or restores an image so as to recognize a poor license plate with eyes. For example, the restoration neural network may be a neural network which performs learning for a recognizable license plate restoration image on the basis of a generative adversarial network (GAN) technique, thereby restoring a poor license plate image.

Moreover, the neural network learning unit 270 may perform learning of the recognition neural network for identifying a number of a license plate difficult for a person to recognize in step S274.

The recognition neural network may be a neural network for identifying a number of a license plate difficult for a person to recognize. For example, the recognition neural network may be a number identification neural network generated from learning data GT on the basis of a convolution neural network (CNN) such as VGG and ResNet.

The learning data obtaining unit 260 may obtain additional learning data based on a result of a license plate read by the license plate reading apparatus 100. The neural network leaning unit 270 may learn the additional learning data obtained by the learning data obtaining unit 260 to update a current restoration neural network and a current recognition neural network. That is, the neural network learning unit 270 may perform repetition learning on the additional learning data obtained by the learning data obtaining unit 260 by using a previous neural network to improve the previous neural network into a neural network having enhanced performance.

The neural network managing unit 280 may store the restoration neural network and the recognition neural network, each generated by the neural network learning unit 270, in a storage of the license plate learning apparatus 150.

The neural network managing unit 280 may store and manage a restoration neural network 282 and a recognition neural network 284 each generated by the neural network learning unit 270. For example, the neural network managing unit 280 may store and manage a neural network by units of neural network generating versions. Subsequently, the neural network managing unit 280 may transfer a neural network, requested by the license plate reading apparatus 100, to the license plate reading apparatus 100.

A license plate learning method according to an embodiment may include a step (step 1) of obtaining learning data of a license plate, a step (step 2-1) of generating the restoration neural network 282 for learning the learning data to restore a license plate image, and a step (step 2-2) of learning the learning data to generate the recognition neural network 284 for identifying a number of the license plate.

In the step 1, the learning data obtaining unit 260 may obtain the learning data of the license plate. For example, as described above, the learning data obtaining unit 260 may obtain one piece of learning data corresponding to a whole license plate, or may obtain learning data by units of vehicle numbers of a license plate. In an embodiment, the step 2-1 and the step 2-2 may be sequentially or simultaneously performed. In another embodiment, the step 2-1 and the step 2-2 may be performed in a reverse order.

The license plate learning method may further include a step (step 3) of obtaining additional learning data on the basis of a result of reading of the license plate and a step of learning the additional learning data to update the restoration neural network 282 which is generated in the step 2-1 and the recognition neural network 284 which is generated in the step 2-2.

Hereinafter, the license plate reading apparatus 100 will be described.

The license plate reading apparatus 100 may be an electronic device which reads a license plate on the basis of a license plate image. The license plate reading apparatus 100 may include a processor and a storage for storing a restoration neural network and a recognition neural network for each reading the license plate image and the license plate. The processor of the license plate reading apparatus 100 may be configured to execute a license plate detecting unit 220 for obtaining the license plate image, an image restoring unit 232 for restoring the license plate image on the basis of the restoration neural network, and an image recognizing unit 234 for recognizing a number of the license plate image on the basis of the recognition neural network.

The processor of the license plate reading apparatus 100 may be further configured to execute a neural network obtaining unit 250 which obtains the restoration neural network 282 and the recognition neural network 284 and stores the obtained restoration neural network 282 and recognition neural network 284 in the storage of the license plate reading apparatus 100. The neural network obtaining unit 250 may download and manage a latest-version restoration neural network 282 and a latest-version recognition neural network 284 from the license plate learning apparatus 150 before the license plate reading apparatus 100 performs a license plate reading function. For example, the neural network obtaining unit 250 may be configured to update a latest-version neural network from the license plate learning apparatus 150 according to a request of a user or automatically in an apparatus.

The processor of the license plate reading apparatus 100 may be further configured to execute the image obtaining unit 210. The image obtaining unit 210 may select or determine an image including a license plate difficult to recognize, thereby obtaining an input image. Also, the image obtaining unit 210 may manage an image including a poor license plate captured in various real environments.

The license plate detecting unit 220 may recognize a license plate position in the input image obtained or selected by the image obtaining unit 210 to detect a license plate image. In an embodiment, the license plate detecting unit 220 may extract a license plate image in the form capable of being processed by the image reading unit 230.

In an embodiment, the license plate detecting unit 220 may obtain a license plate image corresponding to a whole license plate, or may obtain a license plate image by units of vehicle numbers of a license plate. For example, the license plate detecting unit 220 may include a license plate dividing unit 222 which divides the input image by units of vehicle numbers of the license plate to generate the license plate image.

The image reading unit 230 may read the license plate image received from the license plate detecting unit 220 by using the restoration neural network 282 and the recognition neural network 284 each managed by the neural network obtaining unit 250.

In an embodiment, the image reading unit 230 may include an image restoring unit 232 and an image recognizing unit 234.

The image restoring unit 232 may restore the license plate image to at least one restoration image on the basis of the restoration neural network 282 obtained by the neural network obtaining unit 250. That is, by using the restoration neural network 282 generated by the license plate learning apparatus 150, the image restoring unit 232 may restore the license plate image, received from the license plate detecting unit 220, to at least one restoration image and may provide the at least one restoration image. For example, the image restoring unit 232 may generate various restoration images from one license plate image by adjusting an initial value, a parameter, and the number of layers of the restoring neural network 282.

Figure 4A:
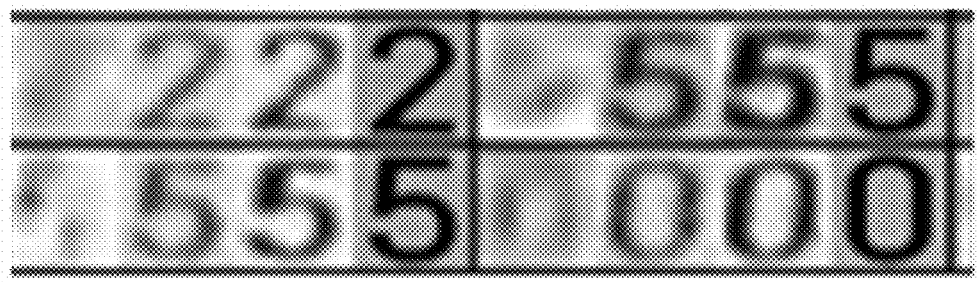
FIGS. 4A to 4C illustrate exemplary image restoration results and exemplary number recognition results.

FIG. 4A illustrates an exemplary restoration image restored by the image restoring unit 232. The image restoring unit 232 may perform restoration on a left license plate image on the basis of the restoring neural network 282 to obtain a restoration image which is sharpened toward the right.

The image recognizing unit 234 may determine at least one prediction number corresponding to the license plate image on the basis of the recognition neural network 284 obtained by the neural network obtaining unit 250. That is, the image recognizing unit 234 may recognize a vehicle number in the license plate image received from the license plate detecting unit 220 by using the recognition neural network 284 generated by the license plate learning apparatus 150.

In an embodiment, the image recognizing unit 234 may recognize the prediction number as a number of an image on the basis of a probability value of the prediction number predicted from the license plate image. For example, the image recognizing unit 234 may provide at least one prediction number on the basis of a probability value of an accuracy of the prediction number. For example, the image recognizing unit 234 may provide prediction numbers of No. 1 priority, No. 2 priority, . . . , and No. N priority in descending order of the probability value of the accuracy of the prediction number. Here, N may be a natural number.

Figure 4B:
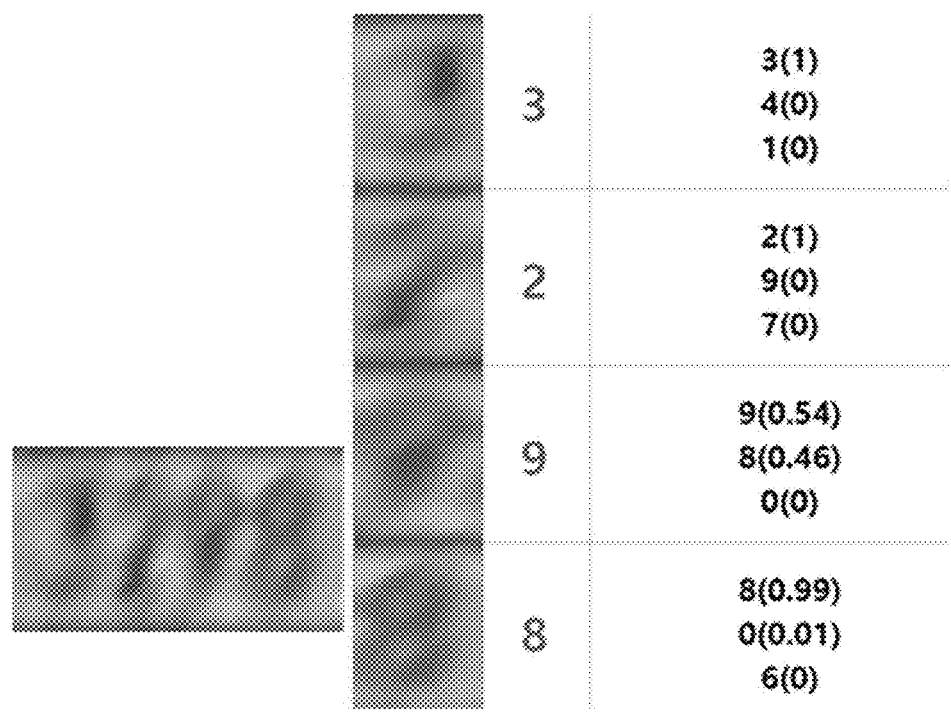

FIG. 4B exemplarily illustrates a prediction number and a probability value each recognized by the image recognizing unit 234. 3, 4, and 1, which are prediction numbers recognized by the image recognizing unit 234 by using a recognition neural network, may be provided in the order of probability values of respective numbers in association with a first license plate image.

In an embodiment, the image recognizing unit 230 may simultaneously perform generating of a restoration image by the image restoring unit 232 and number recognition by the image recognizing unit 234. In another embodiment, the image reading unit 230 may sequentially perform generating of the restoration image by the image restoring unit 232 and number recognition by the image recognizing unit 234.

In an embodiment, the image reading unit 230 may provide a read result by individually using the restoration neural network 282 and the recognition neural network 284.

Alternatively, the image reading unit 230 may perform number recognition by the recognition neural network 284 by using a restoration result of the restoration neural network 282. That is, the image recognizing unit 234 may perform number recognition by using, as an input, at least one restoration image restored by the image restoring unit 232. In this case, the image restoring unit 232 may restore a license plate number, detected by the license plate detecting unit 220, to at least one restoration image on the basis of the restoration neural network 282, and the image recognizing unit 234 may determine at least one prediction number of a restoration image restored by the image restoring unit 232 on the basis of the recognition neural network 284.

Figure 4C:
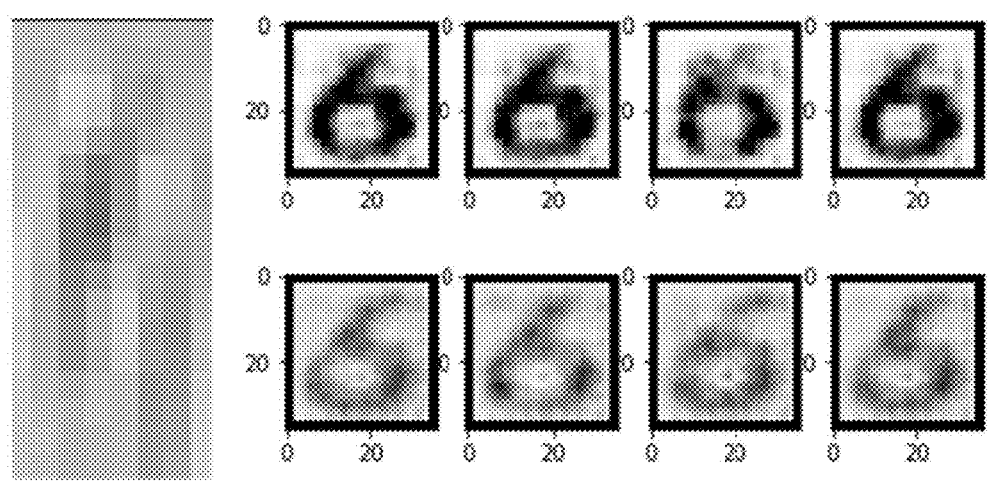

Referring to FIG. 4C, for example, it may be assumed that the image restoring unit 232 improves a digit of a poor image, illustrated on the left, into a restoration image illustrated on the right and provides the restoration image.

In a case where the image restoring unit 232 and the image recognizing unit 234 operate individually, the image recognizing unit 234 may perform number recognition by using the poor image on the left of FIG. 4C.

Alternatively, in a case where the image recognizing unit 234 uses a restoration result of the image restoring unit 232, the image recognizing unit 234 may perform number identification by using the restoration image on the right of FIG. 4C. Here, a prediction number determined as a result of the number identification by the image recognizing unit 234 may be recognized as at least one prediction number by units of restoration images as in FIG. 4C, based on the use of the restoration neural network 282.

In an embodiment, the image recognizing unit 234 may recognize a prediction number, predicted based on the recognition neural network 284, as a number of a license plate image on the basis of a frequency number or a probability value of the prediction number. This will be described below with reference to a table 510 of FIG. 5.

Figures 5, 6A:
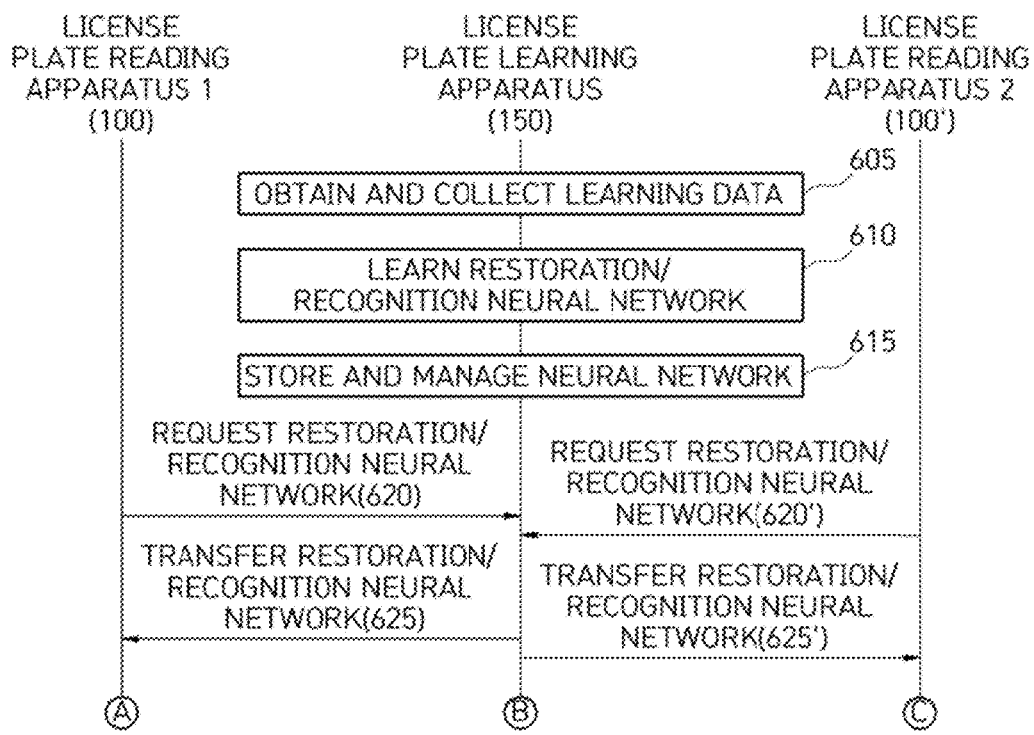

FIG. 5 is a chart illustrating a recognition neural network application result according to an embodiment.

The image recognizing unit 234 may provide a recognition result of each restoration image on the basis of a probability value by using at least one restoration image restored by the image restoring unit 232.

In detail, the image recognizing unit 234 may provide at least one prediction number on the basis of a probability value of a single restoration image. Alternatively, the image recognizing unit 234 may provide a final result by using statistics and a probability value of the at least one prediction number recognized from each of a plurality of restoration images.

For example, in a case where the image restoring unit 232 restores one license plate image to n (where n is a natural number) number of restoration images, the image recognizing unit 234 may provide at least one prediction number of each restoration image and a probability value of an accuracy of each of the at least one prediction number. Here, the image recognizing unit 234 may provide a final prediction number and a probability value by using 1) a sum of probability values and/or 2) a frequency number of each prediction number.

The table 510 of FIG. 5 will be described below.

$X_{i,j}$=a top$_j^{th}$-predicted digit X of an i$^{th}$ restoration image (i.e., a restoration image), $X \in \{0, 1, \ldots, 9\}$ $P_{i,j}$=a probability value of the top$_j^{th}$-predicted digit X of the i$^{th}$ restoration image 1) In a case where the image recognizing unit 234 uses a probability value in determining a final prediction number, the image recognizing unit 234 may calculate $P_x = \Sigma P_{i,j}$ of each factor ($X \in \{0, 1, \ldots, 9\}$) of X, select an X value corresponding to TOP3 from among ten $P_x$, and use the selected X value as a final result.

2) In a case where the image recognizing unit 234 uses a frequency number of a TOP3 digit in determining the final prediction number, the image recognizing unit 234 may check Nx=count(Xi,j) which is a number of times of each factor ($X \in \{0, 1, \ldots, 9\}$) of X, select an X value corresponding to TOP3 from among ten $N_x$, and use the selected X value as a final result.

In the above-described embodiment, a case where a prediction number is a digit has been described. However, the present embodiment is not limited thereto, and as described above, a number may include a letter and various signs.

Referring again to FIG. 2, the image reading unit 230 may receive and autonomously process a whole license plate at a time and may divide the license plate by units of numbers to recognize the license plate. This may be configured identical to a method which is selected in neural network learning by the license plate learning apparatus 150.

The license plate reading apparatus 100 may further include a display unit 240 which displays a read result of a license plate image. The display unit 240 may display the read result in the form of one license plate. In a case where the license plate detecting unit 220 divides the license plate by units of numbers by using a license plate dividing unit 222 to generate a license plate image, the display unit 240 may merge results, obtained by reading a license plate by units of numbers by using a license plate merging unit 242, in the form of one license plate and may provide a merged result.

The license plate reading apparatus 100 may provide a read result of a license plate image to the license plate learning apparatus 150 so that the license plate learning apparatus 150 uses the read result as learning data.

Figure 3:
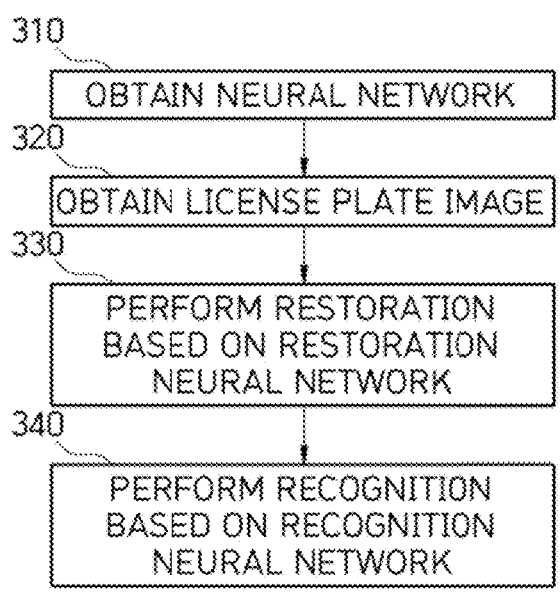
FIG. 3 is a flowchart of a license plate reading process according to an embodiment.

FIG. 3 is a flowchart of a license plate reading process according to an embodiment.

A method of reading a license plate on the basis of a license plate image according to an embodiment may include step 310 of obtaining a restoration neural network and a recognition neural network for reading a license plate, step 320 of obtaining a license plate image which is to be read, step 330 of restoring the license plate image on the basis of the restoration neural network, and step 340 of recognizing a number of the license plate image on the basis of the recognition neural network.

In step 310, the neural network obtaining unit 250 may obtain the restoration neural network and the recognition neural network for reading a license plate.

In step 320, the license plate detecting unit 220 may obtain a license plate image which is to be read.

In step 330, the image restoring unit 232 may restore the license plate image on the basis of the restoration neural network. That is, the image restoring unit 232 may restore the license plate image, obtained in step 320, on the basis of the restoration neural network to generate at least one restoration image.

In step 340, the image recognizing unit 234 may recognize a number of the license plate image on the basis of the recognition neural network. That is, the image recognizing unit 234 may recognize at least one prediction number from the license plate image which is obtained in step 320, based on the recognition neural network. In another embodiment, the image recognizing unit 234 may recognize at least one prediction number of each of the at least one restoration image which is restored in step 330, based on the recognition neural network.

In step 340, as descried above, the image recognizing unit 234 may recognize the prediction number as a number of the license plate image on the basis of the license plate image or the probability value or frequency number of the prediction number of each restoration image.

In an embodiment, step 330 and step 340 may be sequentially or simultaneously performed.

Additionally, the license plate reading method may further include a step of transmitting the read result of the license plate. In this step, the processor of the license plate reading apparatus 100 may transmit the read result to the license plate learning apparatus 150.

FIGS. 6A and 6B are flowcharts illustrating an operating process of a license plate reading system according to an embodiment.

For convenience of description, a process of operating a poor license plate reading system by using two license plate reading apparatuses 100 and 100' using one license plate learning apparatus 150 generating a neural network and the neural network provided by the license plate learning apparatus 150 will be described below.

An operation of the license plate reading system may start in learning the neural network of a license plate learning apparatus 150.

In step 605, the license plate learning apparatus 150 may obtain and collect learning data on the basis of the purpose of a neural network which is to be generated. For example, the restoration neural network 282 may use high-quality number images with learning data GT. For example, the recognition neural network 284 may provide GT by using a digit text label.

In step S610, the license plate learning apparatus 150 may generate purpose-based neural networks through deep learning by using the collected learning data as an input value, and in step S615, the license plate learning apparatus 150 may store and manage the generated neural networks by using a storage of the license plate learning apparatus 150.

Subsequently, a neural network managed by the license plate learning apparatus 150 may be requested through a license plate reading apparatus 1 (110) network and a license plate reading apparatus 2 (110') network in steps 620 and 620' and may be received in steps 625 and 625'. The neural network may be stored and managed in a storage of the license plate reading apparatus 1 (110) and a storage of the license plate reading apparatus 2 (110') in steps 630 and 630'. Here, the license plate reading apparatus 1 (110) and the license plate reading apparatus 2 (110') may obtain a latest-version neural network from the license plate learning apparatus 150 periodically or according to a request.

In steps 635 and 635', the license plate reading apparatus 1 and 2 (100 and 100') may obtain a new poor input image including a license plate.

In steps 640 and 640', the license plate reading apparatus 1 and 2 (100 and 100') may recognize an in-image license plate through image processing to detect a license plate image, and depending on the case, may divide a number in the license plate image in steps 645 and 645'.

In steps 650 and 650', the license plate reading apparatus 1 and 2 (100 and 100') may select a recognition neural network on the basis of the purpose of reading image and may perform image restoration and/or image recognition.

In steps 655 and 655', the license plate reading apparatus 1 and 2 (100 and 100') may merge final read results, and in steps 660 and 660', may process the read result in the form of license plate and may provide a processed read result through a display screen.

Additionally, in steps 665 and 665', the license plate reading apparatus 1 and 2 (100 and 100') may transfer the license plate image and the read result to the license plate learning apparatus 150.

In step 670, the license plate learning apparatus 150 may perform learning on learning data which is added in steps 665 and 665', thereby updating a previous neural network. That is, the license plate learning apparatus 150 may update the previous neural network by using the added learning data received through feedback, thereby providing enhanced performance.

Hereinabove, for convenience of description, a license plate has been described for example, but an embodiment of the present invention is not limited thereto. The license plate reading system according to an embodiment may be applied to license plates such as road numbers and home addresses, in addition to vehicle license plates.

The present invention is not limited to only a system for reading a vehicle license plate and may be applied to a system for reading various license plates in an image. For example, the license plate reading system according to an embodiment of the present invention may be applied for reading a road sign and reading a home address of a delivery place in the middle of moving along a delivery route in a manned delivery system using drones.

The license plate reading apparatus and method and the license plate learning apparatus and method according to an embodiment of the present invention may be implemented in a computer system, or may be recorded in a recording medium. The computer system may include at least one processor, a memory, a user input device, a data communication bus, a user output device, and a storage. The above-described elements may perform data communication therebetween through the data communication bus.

The computer system may further include a network interface coupled to a network. The processor may be a central processing unit (CPU), or may be a semiconductor device for processing instructions stored in a memory and/or a storage.

The memory and the storage may include various types of volatile or non-volatile storage mediums. For example, the memory may include read-only memory (ROM) and random access memory (RAM).

The license plate reading method and the license plate learning method according to an embodiment of the present invention may be implemented as methods executable by a computer. When the license plate reading method and the license plate learning method according to an embodiment of the present invention are performed by a computer device, computer-readable instructions may perform the license plate reading method and the license plate learning method according to an embodiment of the present invention.

The license plate reading method and the license plate learning method according to an embodiment of the present invention may be implemented as computer-readable codes in a computer-readable recording medium. The computer-readable recording medium may include all kinds of recording mediums storing data decodable by a computer system. Examples of the recording mediums may include ROM, RAM, magnetic tape, magnetic disk, flash memory, optical data storage devices, etc. Also, the computer-readable recording medium may be distributed to a computer system connected thereto through a computer communication network and may be stored and executed as a code readable based on a distributed manner.

According to the embodiments of the present invention, a number of unrecognized numbers collected from an image may be restored and identified by using the deep learning technology, thereby providing efficiency in terms of time and cost expended in reading a license plate.

Moreover, according to the embodiments of the present invention, license plate read performance may be enhanced based on a various-purpose neural network learning result provided by the license plate learning apparatus, a connection between neural networks, and a feedback function of the license plate reading apparatus using a neural network.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic device for reading a license plate on the basis of a license plate image, the electronic device comprising:
a storage device for storing a license plate image and a restoration neural network and a recognition neural network for each reading the license plate; and
a processor,
wherein the processor comprises:
a license plate detecting unit for obtaining the license plate image;
an image restoring unit for restoring the license plate image on the basis of the restoration neural network; and
an image recognizing unit for recognizing a number of the license plate image on the basis of the recognition neural network,
wherein the image restoring unit restores the license plate image to at least one restoration image on the basis of the restoration neural network, and
the image recognizing unit determines at least one prediction number corresponding to the restoration image on the basis of the recognition neural network,
wherein the image recognizing unit recognizes the at least one prediction number as a number of the license plate image on the basis of a frequency number of the at least one prediction number.

2. The electronic device of claim 1, wherein the license plate detecting unit obtains each number of the license plate or the whole license plate as the license plate image.

3. The electronic device of claim 1, wherein the image restoring unit restores the license plate image to at least one restoration image on the basis of the restoration neural network.

4. The electronic device of claim 1, wherein the image recognizing unit determines at least one prediction number corresponding to the license plate image on the basis of the recognition neural network and recognizes the at least one prediction number as a number of the license plate image on the basis of a probability value of the at least one prediction number.

5. The electronic device of claim 1, further comprising a display device for displaying a read result of the license plate image,
wherein the display device displays the read result in the form of one license plate.

6. The electronic device of claim 1, wherein the processor is further configured to obtain the restoration neural network and the recognition neural network and store the obtained restoration neural network and recognition neural network in the storage.

7. A method of reading a license plate on the basis of a license plate image, the method comprising:
obtaining a restoration neural network and a recognition neural network for each reading a license plate;
obtaining a license plate image which is to be read;
restoring the license plate image on the basis of the restoration neural network; and
recognizing a number of the license plate image on the basis of the recognition neural network,
wherein the restoring comprises restoring the license plate image to at least one restoration image on the basis of the restoration neural network, and
the recognizing comprises determining at least one prediction number corresponding to the at least one restoration image on the basis of the recognition neural network, wherein the recognizing comprises recognizing the at least one prediction number as a number of the license plate image on the basis of a frequency number of the at least one prediction number.

8. The method of claim 7, further comprising transmitting a read result of the license plate.

* * * * *